United States Patent Office 3,641,039
Patented Feb. 8, 1972

3,641,039
CYCLIC KETAL DERIVATIVES OF CERTAIN TROPINONES AND NORTROPINONES
Jozsef Rakoczi, Gyula Mikite, Lujza Petocz, Janos Fischer, Katalin Grasser, and Ibolya Kosoczky, Budapest, Hungary, assignors to Egyesult Gyogyszer es Tapszergyar, Budapest, Hungary
No Drawing. Filed Dec. 22, 1969, Ser. No. 887,318
Claims priority, application Hungary, Dec. 29, 1968, EE-1,613
Int. Cl. C07d 43/06
U.S. Cl. 260—292    7 Claims

ABSTRACT OF THE DISCLOSURE

New cyclic ketal derivatives of the Formula I

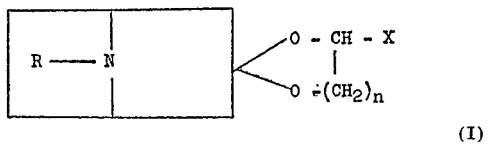

wherein

R represents an alkylene group of 5 to 6 carbon atoms or the residue of an N-substituted nortropane skeleton, wherein the substituent is methyl or ethoxycarbonyl group,
X represents hydrogen, hydroxymethyl, alkoxymethyl, acyloxymethyl, halomethyl, benzoyloxymethyl, carbamoyloxymethyl or piperidino methyl group,
n is an integer between 1 and 4, but if R represents pentamethylene and X is a hydrogen atom, then n is 3 or 4, and if R is hexamethylene and X represents a hydroxymethyl group, so is n an integer between 2 and 4, as well as their acid addition salts and the quaternary onium derivatives of the nitrogen-containing compounds have been prepared by reacting a tropinone with a compound of the Formula II $$HO-(CH_2)_n-CH-OH$$
$$\quad\quad\quad\quad\quad\quad |$$
$$\quad\quad\quad\quad\quad\quad X'$$
(II)

(wherein n has the same meanings as stated above and X' represents a hydrogen, halomethyl or hydroxymethyl group) or with a ketal derivative of the compound of the general Formula II formed with acetone; if a carbamoyl, ether, ester or halo derivative is wanted by carbamoylating, etherifying, esterifying or halogenating the compounds of the Formula I wherein X represents hydroxymethyl group; if a piperidine derivative is wanted, by reacting the compound of the Formula I, wherein X represents halomethyl group, with piperidine or a salt thereof; if a nor-derivative is wanted by reacting the tropinone ketal derivatives with chlorocarbonic acid ethyl ester; and if a salt is wanted, converting the nitrogen-containing compounds of the Formula I into their acid addition salts or quaternary onium derivatives.

The compounds of the Formula I, as well as the therapeutically acceptable acid addition salts and quaternary onium derivatives of the nitrogen-containing compounds are effective tranquillizing agents and in the therapy they can be used first of all in the treatment of parkinsonism.

This invention relates to novel cyclic ketal derivatives i.e. 1,3-dioxolane derivatives and pharmaceutical products containing same, as well as to a process for the preparation thereof.

More particularly this invention relates to compounds of the Formula I

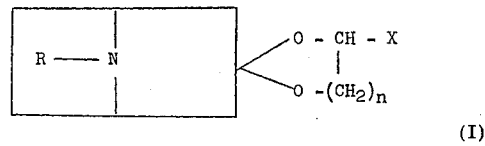

wherein

R represents an alkylene group of 5 to 6 carbon atoms or the residue of an N-substituted nortropane skeleton, wherein the substituent is methyl or ethoxycarbonyl group,
X represents hydrogen, hydroxymethyl, alkoxymethyl, acyloxymethyl, halomethyl, benzoyloxymethyl, carbamoyloxymethyl or piperidinomethyl group,
n is an integer between 1 and 4, but if R is pentamethylene and X represents a hydrogen atom, then n is 3 or 4, and if R is hexamethylene and X represents a hydroxymethyl group, so is n an integer between 2 and 4, as well as to the therapeutically acceptable acid addition salts and quaternary onium derivatives of the nitrogen-containing compounds of the Formula I.

Some of the known 1,3-dioxolane derivatives possess spasmolytic, analgetic, anesthetic and muscle relaxant activity (Chem. Listy 44, 204/1950/, Germany Pat. No. 1,131,226, C.A. 57, 13761d/1962/, U.S. Pat. No. 3,121,-094, Acta Biol. Med. Ger. 7, 212/1961/, Monats. 93, 49 /1962/).

Now we have found that the compounds having the Formula I exert valuable actions on the central nervous system, and first of all they are highly effective tranquillizing agents. Moreover these compounds inhibit effectively the nicotinspasm. In the therapy they can be used first of all in the treatment of parkinsonism. The compounds of the Formula I are absorbed readily in the organism, and their toxicity is extremely low. The results of some pharmacological experiments carried out on male rats are summarizable in Table 1.

TABLE 1

| Compound No.: | $LD_{50}$,[1] mg./kg. | Inhibition of chloropromazine catalepsy | $ED_{50}$ mg./kg. inhibition of perphenazine | Inhibition of nicotinspasm |
|---|---|---|---|---|
| 1 | 2,300 | [1] 78 | [1] 190 | [1] 380 |
| 2 | 1,000 | [2] 50 | | |
| 3 | 1,000 | [2] 68 | [1] 100 | |
| 4 | 600 | [2] 50 | | [2] 26 |
| 5 | 600 | [2] 80 | [1] 100 | [2] 12.5 |
| 6 | 365 | [1] 50 | [1] 66 | [1] 50 |

[1] Intraperitoneal.
[2] By mouth.

As it can be seen from the data mentioned above the most advantageous compounds having the Formula I, are those wherein R and X has the meeting stated above and n is 1 or 2.

The tested compounds are numbered as follows:

(1) N-carbethoxy-nortropinone propyleneketal
(2) Tropinon ethyleneketal methoiodide
(3) Tropinon propyleneketal methoiodide
(4) Tropinon ethyleneketal hydrochloride
(5) Tropinon propyleneketal hydrochloride
(6) 1-cyclohexyl-1-phenyl-3-piperidinopropan-1-ol hydrochloride (reference compound)

The compounds having the Formula I, as well as the therapeutically acceptable acid addition salts and quaternary onium derivatives of the nitrogen-containing compounds of the Formula I can be prepared as follows:

tropinone is reacted with a compound of the Formula II

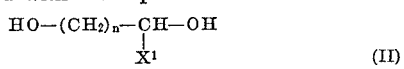

(wherein $n$ has the same meanings as stated above, and X' represents a hydrogen, halomethyl or hydroxymethyl group) or with a ketal derivative of the compound of the Formula III formed with acetone; the compounds of the Formula I, wherein X represents a hydroxymethyl group, can be carbamoylated, etherified, esterified or halogenated; those wherein X represents halomethyl group, can be reacted with piperidine or a salt thereof; the tropinone ketal derivatives can be reacted with chlorocarbonic acid ethyl ester; the nitrogen-containing compounds of the Formula I can be converted into their therapeutically acceptable acid addition salts or quaternary onium derivatives; and the salts of the nitrogen containing compounds having the Formula I may be converted into the free bases.

The compounds of the Formula II and tropinone are preferably reacted in the presence of an acidic catalyst. As acidic catalyst, a Lewis acid can be used as well. According to another method the reaction is carried out in the presence of a water-immiscible solvent which forms an azeotropic mixture with water—e.g. benzene—and the water formed in the course of the reaction is removed by distillation.

The compounds of the Formula I, as well as the acid addition salts and the quaternary onium derivatives of the nitrogen containing compounds of the Formula I can be transformed as such, or together with other biologically active and/or synergetic agents into pharmaceutical products by adding the required carrier-, binding-, and/or auxiliary materials usable in the pharmaceutical industry. As carriers, binding agents and auxiliary materials e.g. water, pharmaceutically acceptable organic solvents, starch, lactose, calcium carbonate, magnesium stearate, talc and the like can be used.

The present invention is further elucidated by the aid of the examples. The examples are given for the purpose of illustration and not by way of limitation. In the examples the compounds having tropane skeleton are cited as ketals of tropinone, corresponding to the nomenclature used in Chemical Abstracts.

EXAMPLE 1

234.0 g. (1.68 moles) of tropinone are dissolved in 1 l. of benzene, the solution is introduced into a 2 l. round bottomed flask equipped with a stirrer and a water-separator, and 349.3 g. (1.84 moles) of p-toluenesulfonic acid monohydrate are added to the solution with cooling in ice bath. Thereafter 104.5 g. (95 ml., 1.68 moles) of ethyleneglycol are added to the mixture, and the mixture is heated to an external temperature of 120 to 130° C. with stirring. The benzene solution is refluxed and the water formed in the reaction is continuously separated. The whole quantity of water (65 to 70 ml.) separates within 10 to 12 hours. The reaction mixture is cooled to room temperature and the separated crystalline tropinone ethyleneketal p-toluenesulfonate is filtered off. The crude product is slurried in 1 l. of acetone, the suspension is stirred at room temperature for 1 hour, then it is filtered. 545 g. (91%) of pure product are obtained, M.P.: 168–169° C.

The thus-obtained tropinone ethyleneketal p-toluenesulfonate is dissolved in a 11 fold quantity of water, and the calculated amount of sodium hydroxide solution is added to the solution under stirring and cooling. The mixture is extracted with 3×200 ml. of chloroform, the chloroform solution is dried over anhydrous magnesium sulfate, filtered, and the solvent is evaporated. The residue is distilled at 6 mm. Hg. 242 g. (79%) of tropinone ethyleneketal are obtained, B.P.: 99–100° C./6 mm. Hg, $n_D^{20}=1.4920$.

*Analysis.*—Calculated (percent): C, 65.55; H, 9.35; N, 7.64. Found (percent): C, 65.13; H, 9.83; N, 7.61.

The following derivatives of tropinone-ethyleneketal have been prepared:

Tropinone ethyleneketal methoiodide, M.P.: 176–177° C. (recrystallized from acetone)
Tropinone ethyleneketal hydrochloride, M.P.: 237–239° C. (recrystallized from chloroform)
Tropinone ethyleneketal picrate, M.P. 199–201° C. (recrystallized from ethanol).

EXAMPLE 2

139 g. (1 mole) of tropinone, 500 ml. of benzene and 209 g. of p-toluenesulfonic acid monohydrate are introduced into a 2 l. round bottomed flask equipped with a stirrer and a water-separator, to the solution of tropinone p-toluenesulfonate 91 g. (86 ml.) of 1,3-propanediol are added, and the mixture is refluxed for 10 hours with stirring. At the end of the reaction about 40 ml. of water separates. The benzene solution is concentrated, an aqueous solution of 50 g. of sodium hydroxide is added to the residue, and the tropinone propylene-(1,3)-ketal is extracted into chloroform. The chloroform solution is dried over anhydrous magnesium sulfate, filtered, and the solvent is distilled off. The residue is distilled at 7 mm. Hg. 85.4 g. (44%) of tropinone propylene-(1,3)-ketal are obtained, B.P.: 125–130° C./7 mm. Hg, $n_D^{20}=1.4972$.

*Analysis.*—Calculated (percent): C, 66.97; H, 9.71; N, 7.10. Found (percent): C, 66.53; H, 9.69; H, 7.15.

The following derivatives of tropinone propylene-(1.3)-ketal have been prepared:

Tropinone propylene-(1.3)-ketal p-toluenesulfonate, M.P.: 109–111° C.
Tropinone-propylene-(1.3)-ketal hydrochloride, M.P.: 201–202° C.

EXAMPLE 3

139 g. (1 mole) of tropinone and 500 ml. of benzene are introduced into a 2 l. round bottomed flask equipped with a stirrer and a water-separator, and 209 g. p-toluenesulfonic acid monohydrate are added to the mixture under cooling. Thereafter 84 ml. of glycerol are added to the benzene solution of tropinone-p-toluenesulfonate, and the mixture is refluxed for 10 hours with stirring. At the end of the reaction 50 ml. of water separates. The mixture is cooled, the benzene is distilled off, and the residue is treated with an aqueous solution of 50 g. of sodium hydroxide. The solution is extracted with 3× 150 ml. of chloroform, the chloroform solution is dried over anhydrous magnesium sulfate, filtered, and the solvent is distilled off. The residue is distilled at 1 mm. Hg. 96.6 g. (45.5%) of tropinone glycerol-(1.2)-ketal are obtained, B.P.: 118–120° C./1 mm. Hg.

Tropinone glycerol-(1.2)-ketal is converted into its methotosylate. The quaternary salt melts at 156–158° C.

*Analysis.*—Calculated (percent): C, 57.11; N, 3.49; S, 8.02. Found (percent): C, 57.21; N, 3.48; S, 8.04.

48 g. of tropinone-glycerol-(1.2)-ketal are dissolved in 200 ml. of chloroform, 29 ml. of benzoyl chloride are added dropwise to the solution, and the mixture is refluxed for 4 hours. The solvent is distilled off, the crystalline residue is washed with acetone and recrystallized from a mixture of chloroform and petrol. 51.2 g. of tropinone glycerol-(1.2)-ketal-benzoate hydrochloride are obtained, M.P.: 207° C.

*Analysis.*—Calculated (percent): C, 61.10; N, 3.96; Cl, 10.02. Found (percent): C, 61.32; N, 4.10; Cl, 10.24.

EXAMPLE 4

112 g. (0.6 mole) of tropinone ethylene-ketal are dissolved in 150 ml. of abs. benzene, and 175 ml. of chlorocarbonic acid ethyl ester in 120 ml. of abs. benzene are added dropwise to the refluxing solution under stirring. The mixture is refluxed and stirred until the gas evolution ceases, then it is allowed to stand at room temperature. The small amount of solid which separates is removed by filtration, the benzene solution is washed successively with 3× 40 ml. of 10% acetic acid and 2× 40 ml. of water, dried, and the solvent is distilled off. The residue is distilled at 0.2 mm. Hg. 91 g. (63%) of N-ethoxy-carbonyl-nortropinone ethyleneketal are obtained, B.P.: 105–106° C./0.2 mm. Hg, M.P.: 61° C.

*Analysis.*—Calculated (percent): C, 59.75; H, 5.90; N, 7.89. Found (percent): C, 60.06; H, 6.05; N, 7.76.

EXAMPLE 5

30 g. of tropinone glycerol-ketal-benzoate hydrochloride is dissolved in a solution of 4.5 g. of sodium hydroxide in 250 ml. of water, the mixture is extracted with 3× 60 ml. of benzene, and the extract is dried over anhydrous magnesium sulfate. The benzene solution is filtered, the filtrate is heated to reflux, and a mixture of 30 ml. benzene and 39 g. (34.2 ml.) of chlorocarbonic acid ethyl ester are added to the solution. The mixture is refluxed until the gas evolution ceases, then it is cooled to room temperature and filtered. The filtrate is washed successively with 30 ml. of 10% acetic acid and 2× 20 ml. of water, the benzene solution is dried and the solvent is distilled off. The residue is distilled at 0.08 mm. Hg. 20.8 g. (65.2%) of N-ethoxycarbonyl-nortropinone-glycerol-(1.2)-ketal-benzoate are obtained, B.P.: 199–200° C./0.08 mm. Hg, M.P.: 88–90° C.

*Analysis.*—Calculated (percent): C, 63.99; H, 6.71; N, 3.73. Found (percent): C, 63.96; H, 7.01; N, 3.55.

What we claim is:
1. A compound of the formula

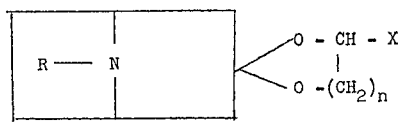

wherein R is a member selected from the group consisting of methyl and ethoxycarbonyl, X is a member selected from the group consisting of hydrogen, benzoyloxymethyl and hydroxy-methyl, and $n$ is 1 or 2.

2. Tropinone ethyleneketal as well as the therapeutically acceptable acid addition salts and methoiodide quaternary onium derivatives thereof.

3. Tropinone propylene-(1.3)-ketal as well as the acid addition salts and quaternary onium derivatives thereof therapeutically acceptable acid addition salts and methoiodide quaternary onium derivatives thereof.

4. Tropinone glycerol-(1.2)-ketal as well as the acid addition salts and quaternary onium derivatives thereof therapeutically acceptable acid addition salts and methoiodide quaternary onium derivatives thereof.

5. N-ethoxy - carbonyl - nortropinone-ethyleneketal as well as the acid addition salts and quaternary onium derivatives thereof therapeutically acceptable acid addition sals and methoiodide quaternary onium derivatives thereof.

6. N-ethoxy - carbonyl-nortropinone - glycerol-(1.2)-ketal as well as the acid addition salts and quaternary onium derivatives thereof therapeutically acceptable acid addition salts and methoiodide quaternary onium derivatives thereof.

7. N-ethoxy - carbonyl-nortropinone - propylene-(1.3)-ketal as well as the acid addition salts and quaternary onium derivatives thereof therapeutically acceptable acid addition salts and methoiodide quaternary onium derivatives thereof.

References Cited
FOREIGN PATENTS 777,800   2/1968   Canada _____ 260—292

ALAN L. ROTMAN, Primary Examiner

U.S. Cl. X.R.

260—294 S, 294.7 D, 335, 340.6, 340.9; 424—265, 267, 275